July 12, 1927.
E. R. CAREY
1,635,706
FRONT AXLE ASSEMBLY
Filed Dec. 5, 1925
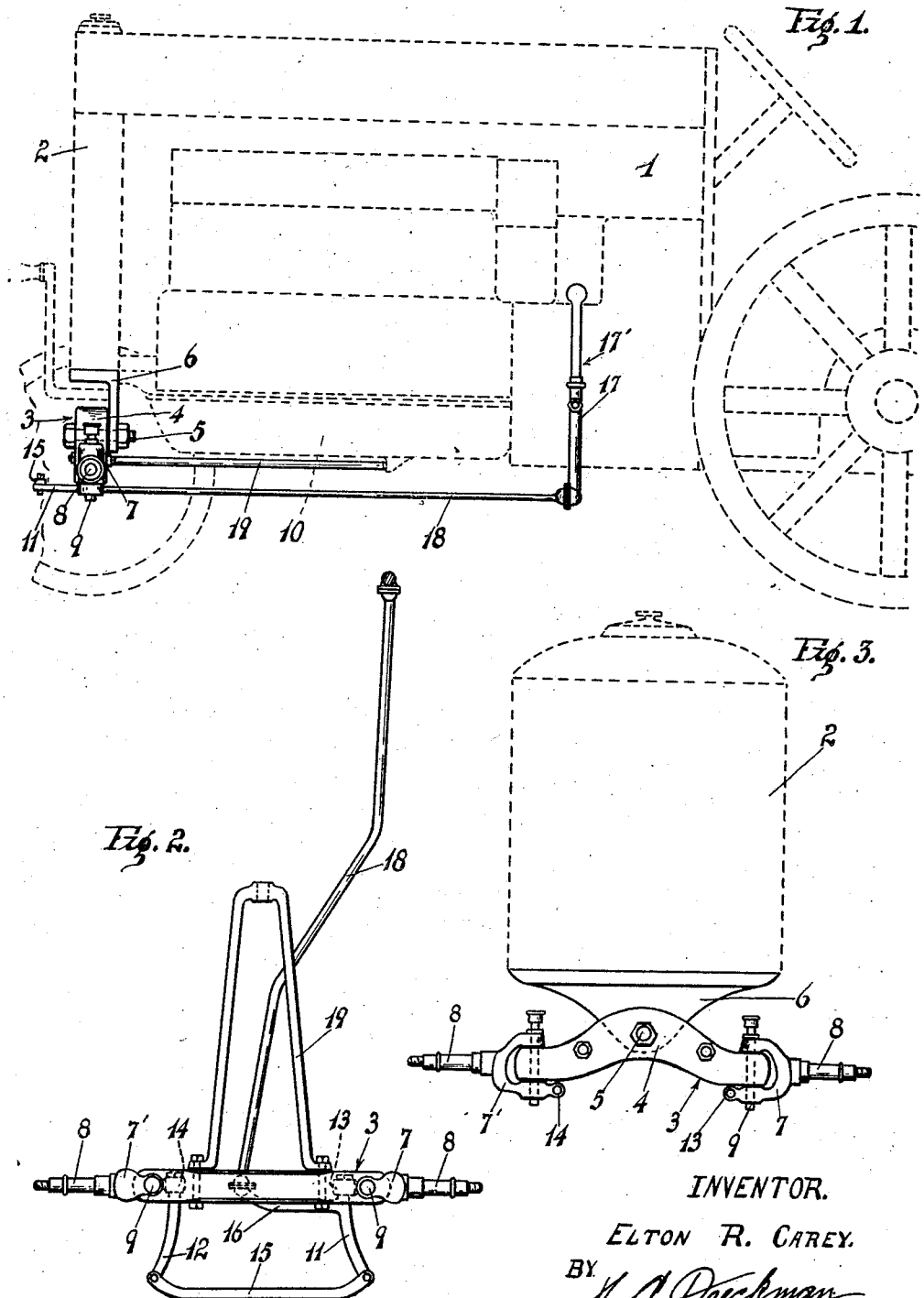
INVENTOR.
ELTON R. CAREY.
BY H. A. Dyckman
ATTORNEY.

Patented July 12, 1927.

1,635,706

UNITED STATES PATENT OFFICE.

ELTON R. CAREY, OF LONG BEACH, CALIFORNIA, ASSIGNOR TO OVELDA E. CAREY, OF LONG BEACH, CALIFORNIA.

FRONT-AXLE ASSEMBLY.

Application filed December 5, 1925. Serial No. 73,336.

The Fordson tractor is extensively used in stevedore work in warehouses and docks, and in this capacity it is essential that the tractor have a very short turning radius to permit operation in a small space.

An object of my invention is to provide a front axle assembly which will give the Fordson tractor a very small turning radius.

An advantage of my axle is that it may be readily attached to a standard Fordson tractor with a minimum of labor. Features of my invention are simplicity in construction, ease in manufacture and effective in operation.

Other objects, advantages, and features of invention may appear from the accompanying drawing the subjoined detailed description and the appended claim.

In the drawing illustrating my invention,

Fig. 1, is a side elevation of my axle in position on a tractor.

Fig. 2, is a plan view of my axle detached from the tractor.

Fig. 3, is a front elevation of the axle in position on a tractor, but with the reach rod removed.

Referring more particularly to the drawing;—the standard Fordson tractor 1 has the usual radiator 2 mounted on the forward end thereof.

My front axle 3 is substantially the same width as the radiator 2, and is formed with an upwardly bent portion 4 in the center thereof. The axle 3 is pivotally mounted at the center thereof on a pin 5 which pin extends through said axle and through a mounting plate 6. This plate is secured to the tractor chassis below the radiator 2.

The usual spindle yokes 7—7' each have a spindle 8 thereon; upon which the front wheels are mounted. The yokes are pivotally mounted at the ends of the axle 3 on bearing pins 9 in the usual manner. The bend in the axle 3 is such that the yokes 7, 7' are positioned below the pivot 5 thus enabling the wheels on the spindles 8 to pass under the radiator and close to the engine crank case 10 to effect a short turn.

Arms 11, 12, are secured to lugs 13, 14 on the lower end of the yokes 7—7' respectively and extend forwardly from the axle 3 below said axle, and are curved outwardly. A drag link 15 is pivoted to the ends of the arms 11, 12 and causes said arms to move in unison. A guide arm 16 is integrally formed with the arm 11, and extends inwardly therefrom. The steering arm of the Fordson tractor is lengthened by extension 17 to form the arm 17' and a link 18 is connected by ball joints to the arms 17 and 16.

A truss yoke 19 is secured at one end, to the axle 3 and at the other to the engine case 10.

Having described my invention I claim:

A front axle assembly for Fordson tractors comprising an axle, substantially the same width as the tractor radiator, means pivotally mounting said axle to the tractor, spindle yokes pivotally mounted at either end of said axle, said yokes being positioned below the pivot of the axle, outwardly curved arms secured to said yokes extending forwardly of and below said axle, a guide arm secured to one of said arms and extending inwardly therefrom and below the axle, a drag link pivoted to said arms, and an extension on the tractor steering arm, and a steering link pivoted to said extension and to said guide arm, said steering link being below the axle.

In testimony whereof I affix my signature.

ELTON R. CAREY.